Feb. 9, 1926.
F. E. ROBERT
1,572,507
AIR VALVE FOR FUEL MIXTURE CONDUITS
Filed Feb. 11, 1924
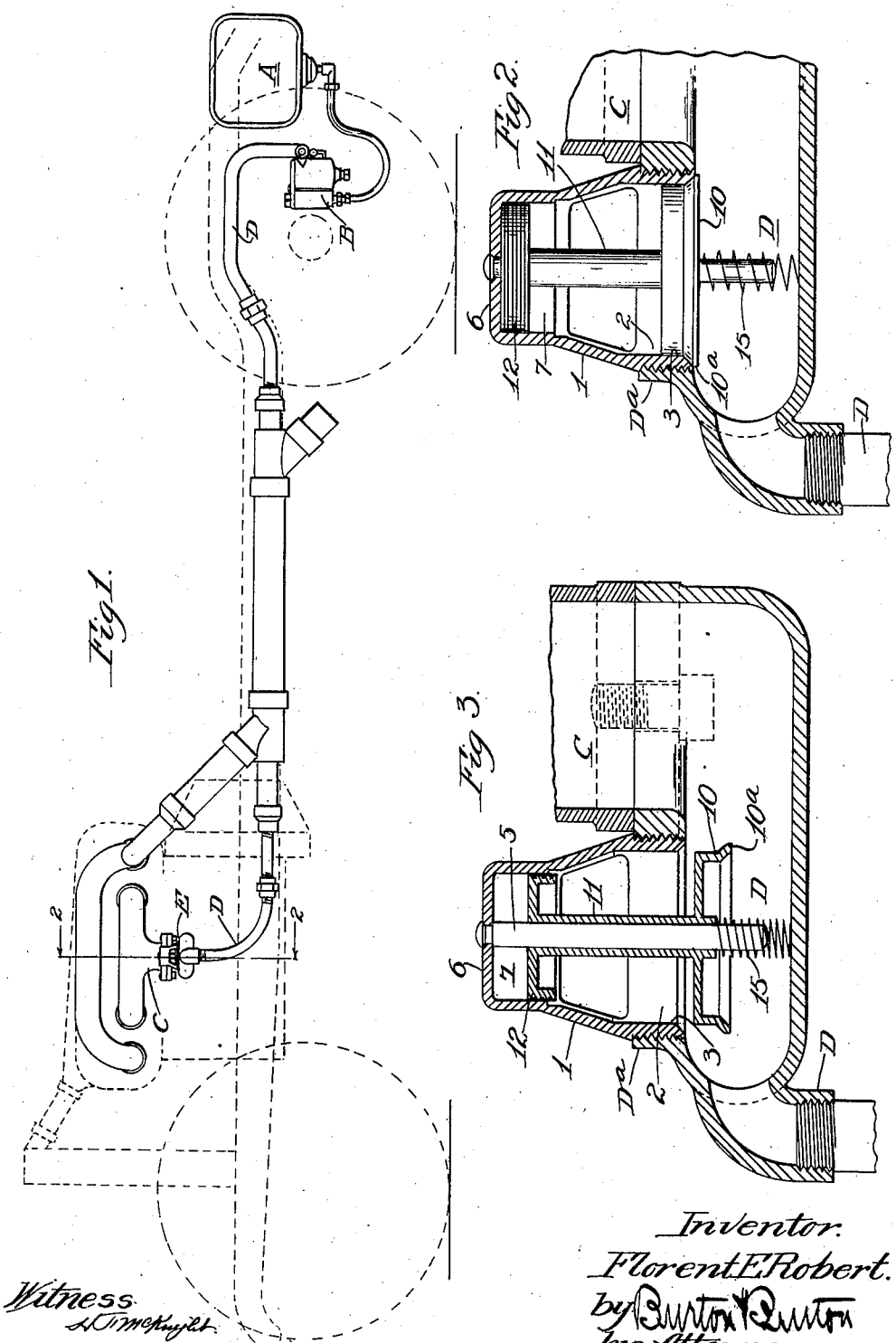
Inventor:
Florent E. Robert.
by [signature]
his Attorneys.

Patented Feb. 9, 1926.

1,572,507

UNITED STATES PATENT OFFICE.

FLORENT E. ROBERT, OF CHICAGO, ILLINOIS, ASSIGNOR TO STEWART-WARNER SPEEDOMETER CORPORATION, OF CHICAGO, ILLINOIS, A CORPORATION OF VIRGINIA.

AIR VALVE FOR FUEL-MIXTURE CONDUITS.

Application filed February 11, 1924. Serial No. 691,936.

*To all whom it may concern:*

Be it known that I, FLORENT E. ROBERT, a citizen of the United States, residing in the city of Chicago, in the county of Cook and State of Illinois, have invented certain new and useful Improvements in Air Valves for Fuel-Mixture Conduits, of which the following is a specification, reference being had to the accompanying drawings, forming a part thereof.

The purpose of this invention is to provide an improved construction in the air inlet valve of a fuel mixture conduit which serves an internal combustion engine which is normally seated and adapted to be opened against yielding resistance by the suction of the engine for admitting the proper air supply, and which shall have delayed opening upon the suction impulse of the engine so as to cause said suction to draw in a priming charge before the air is admitted past the valve for rendering the charge leaner. It consists in the elements and features of construction shown and described as indicated in the claims.

In the drawings:

Figure 1 is a diagrammatic view in the nature of a side elevation of an automobile having its engine equipped with this invention.

Figure 2 is a section at the line, 2—2, through the air valve showing the same closed.

Figure 3 is a similar view showing the valve open.

The fuel mixture supply system diagrammatically shown in the drawings comprises a fuel mixture conduit leading from the discharge of a float bowl or constant level chamber which is supplied by gravity from a supply tank, said conduit delivering the fuel mixture to the engine intake manifold and having a spring-seated yieldingly openable air inlet valve at some point in the extent of the conduit between the connection with the float bowl and the connection with the intake manifold. In the drawings the main supply tank is shown at A, the float bowl at B, the intake manifold at C. D is in general the fuel mixture conduit which, it may be understood, has a primary air inlet antecedent to the fuel connection from the float bowl, whereby a rich mixture is formed in the conduit and drawn therethrough by the suction of the engine for receiving the further admixture of the main air supply at some point before discharge into the engine intake manifold. In the construction shown this air intake valve is located just anterior to the discharge into the intake manifold, as seen at E, in Fig. 1. This air intake device comprises a hollow fitting, 1, open at one end, as seen at 2, and exteriorly threaded for a distance back from that end for screwing into a suitably threaded inlet boss, $D^a$, with which the conduit, D, is provided at the point indicated just antecedent to its connection with the engine intake. This fitting, 1, has its open end margin slightly beveled interiorly to form a terminal valve seat and suitably machined inwardly from said terminal for a short distance over a zone, 3, forming a piston seat for a piston valve hereinafter more particularly described. The fitting is closed at the other end and cylindrically bored, or otherwise formed, over a zone at that end suitably to constitute a dash pot chamber. A rigid guide stem, 5, projects rigidly from the center of the head, 6, of said fitting, 1, extending through the whole length of said fitting and protruding from its open end into the cavity of the conduit, D, as seen in Figs. 2 and 3. On this valve guide stem, 5, there is mounted a valve, 10, having for so mounting it a tubular stem, 11, which carries at the end opposite the valve stem a plunger, 12, for cooperating with the dash pot chamber, 7, said plunger being fitted to said chamber so as to permit very slight air leak around the plunger as it reciprocates in the dash pot chamber. The piston is flanged at its outer end, $10^a$, and the flange is suitably beveled for seating upon the beveled terminal seat, 3, of the fitting, 1, and back of said beveled flange it is finished for piston-wise fit in the piston seat. A coiled spring, 15, is coiled about and centered upon the end of the stem, 2, at the inner side of the valve, 10, reacting between said valve and the opposite wall of the conduit for holding the valve normally seated with its piston portion thrust into the piston seat, and its terminal flange seated upon the terminal beveled flange seat, 3.

The operation of this construction is that upon the starting of the engine by cranking or otherwise, the relatively slow movement of the piston produces a limited depression or vacuum in the conduit which causes the piston valve to be moved in the piston seat in the direction for opening, but with such delayed or retarded movement that the suction operates to draw in a considerable fuel charge before the air valve has moved out of its piston seat, so as to admit air for leaning the charge; and this action,—that is, the drawing in of a rich fuel charge in the first part of the engine stroke before admission of air to lean it,—will occur at each suction stroke while the engine is turning over so slowly that there is sensible interval between the suction impulses of the engine, during which interval the spring, 15, operates for thrusting the piston valve back into its piston seat ready to be withdrawn again with delay at the next suction impulse. There is thus automatically provided a rich priming charge upon the starting of the engine without interfering with the proper mixture when the engine attains its speed so as to substantially hold the valve continuously open by reason of the rapid succession of the suction impulses maintaining the vacuum continuously in the conduit with only slight pulsation. Similar momentary delay in the increased opening of the air valve occurring in the case of rapid acceleration of the engine, will cause a momentary enrichment of the mixture, which is desirable in case of such sudden acceleration.

The action above described will be obtained to a limited extent without the dash pot device above described; but the employment of the dash pot with the plunger member thereof rigid with the piston valve insures the delayed opening of the valve for causing the priming charges above described. This dash pot device, independently of its function in insuring a priming charge,—has a further function in respect to the operation of the engine at ordinary or higher speeds, namely, that whereas upon acceleration of the engine, the sudden increase of suction operating for opening the valve, causes the valve to acquire a momentum, which in the absence of preventing means would open it for a fraction of the stroke more widely than it should be, and thereby interferes for the instance with the proper proportions of the fuel mixture, this momentum action is prevented by the dash pot which also prevents the too sudden closing movement of the valve upon abrupt slacking of the speed of the engine.

I do not limit myself to the specific form of the device shown, many variations which would accomplish the result being obvious; but the construction of the nature of a piston valve which may have a predetermined range of movement along its seat before opening and after closing, constitutes the most characteristic feature, and the association with such a valve of the dash pot for delaying further, is a secondary feature of considerable importance in rendering the device effective for the purpose described.

I claim:—

1. In a fuel mixture forming and feeding system, in combination with a fuel mixture conduit which leads from a source of air and fuel to an engine intake, an air inlet valve device which comprises an inlet port member having a piston valve seat and a piston valve mounted for entering and travelling limitedly in said seat and withdrawing wholly therefrom at the end of limited withdrawal movement, means yieldingly resisting the opening of the valve, and a dash pot device connected with the valve for retarding the movements thereof.

2. An air intake valve device for a fuel mixture conduit comprising a piston seating member and a spring-resisted piston valve member co-operating therewith for complete closure of the inlet port throughout a predetermined range of piston-wise movement, and for full opening at the limit of such predetermined range; whereby upon starting the engine the inlet of air is delayed while a priming charge of fuel is drawn in.

3. In combination with the construction defined in claim 2 foregoing, a dash pot device operatively connected with the piston valve for retarding the re-seating movement of the valve.

4. In combination with the construction defined in claim 2 foregoing, a dash pot device operatively connected with the piston valve for retarding the opening movement of said valve.

5. In the construction defined in claim 1, foregoing, the dash pot comprising a piston chamber formed unitarily with the piston seat member, and a plunger carried by the stem of the valve for reciprocation in said piston chamber.

6. In combination with a fuel mixture conduit through which an internal combustion engine is supplied, an air intake member mounted on the conduit, said member comprising a shell or body having an open end affording a terminal valve seat and a piston valve seating zone extending inwardly from said terminal seat, said shell being laterally apertured for air inlet back of the piston valve seating zone and having back of said lateral apertures a dash pot chamber; a valve guide stem extending from the closed head of said dash pot chamber axially through said shell; a piston valve seating in said piston valve seat and having a marginal flange for seating at said terminal seat, said valve having a tubular stem mounted for reciprocation of the valve on said guide stem, a plunger at the opposite end of said tubular stem from said piston valve reciprocating in the dash pot chamber, and a spring which holds the valve normally seated and yieldingly resists its opening movement.

In testimony whereof, I have hereunto set my hand at Chicago, Illinois, this 7 day of February, 1924.

FLORENT E. ROBERT.